(12) United States Patent
Li

(10) Patent No.: US 11,561,622 B2
(45) Date of Patent: Jan. 24, 2023

(54) FUNCTION CONTROL METHOD, FUNCTION CONTROL DEVICE, AND COMPUTER-READABLE STORAGE MEDIUM

(71) Applicant: BEIJING XIAOMI MOBILE SOFTWARE CO., LTD., Beijing (CN)

(72) Inventor: Zheng Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 37 days.

(21) Appl. No.: 16/923,231

(22) Filed: Jul. 8, 2020

(65) Prior Publication Data

US 2021/0151205 A1 May 20, 2021

(30) Foreign Application Priority Data

Nov. 18, 2019 (CN) .......................... 201911129464.1

(51) Int. Cl.
*G06F 3/01* (2006.01)
*G16Y 40/35* (2020.01)
*G16Y 40/60* (2020.01)
*G06F 3/16* (2006.01)
*G06F 9/54* (2006.01)

(52) U.S. Cl.
CPC .............. *G06F 3/017* (2013.01); *G06F 3/167* (2013.01); *G06F 9/542* (2013.01); *G16Y 40/35* (2020.01); *G16Y 40/60* (2020.01)

(58) Field of Classification Search
CPC ........ G16Y 40/35; G16Y 40/60; G06F 3/017; G06F 3/167; G06F 9/542; H04L 67/12; H04L 69/24; H04L 67/34; H04L 12/2803; H04L 12/2816

USPC ........................................................ 340/501
See application file for complete search history.

(56) References Cited

U.S. PATENT DOCUMENTS

| 2014/0349269 | A1* | 11/2014 | Canoy ................... G06N 20/00 434/322 |
| 2016/0112526 | A1* | 4/2016 | Jeong ..................... H04L 67/26 709/204 |
| 2016/0266557 | A1 | 9/2016 | Zhang et al. |
| 2017/0064073 | A1* | 3/2017 | Spencer ............ H04M 1/72463 |

(Continued)

FOREIGN PATENT DOCUMENTS

| CN | 105182777 A | 12/2015 |
| CN | 105453047 A | 3/2016 |

(Continued)

OTHER PUBLICATIONS

Extended European Search Report for Application No. 20189366.6, dated Jan. 28, 2021.

(Continued)

*Primary Examiner* — Omar CasillasHernandez
(74) *Attorney, Agent, or Firm* — Syncoda LLC; Feng Ma

(57) ABSTRACT

In a function control method, a function trigger event is monitored, the function trigger event having a preset correspondence with function configuration information; when the function trigger event is monitored, the function configuration information corresponding to the function trigger event is retrieved; and a second device is controlled to perform a specified function triggered by the function trigger event based on the function configuration information.

12 Claims, 6 Drawing Sheets

(56) References Cited

U.S. PATENT DOCUMENTS

| | | | |
|---|---|---|---|
| 2018/0323996 A1* | 11/2018 | Roman | H04L 12/2829 |
| 2018/0348718 A1* | 12/2018 | Richardson | H04W 4/029 |
| 2019/0081810 A1* | 3/2019 | Jung | G10L 15/30 |
| 2019/0173684 A1 | 6/2019 | Ocher et al. | |
| 2019/0272132 A1* | 9/2019 | Tokuchi | G06F 3/1205 |
| 2020/0110928 A1* | 4/2020 | Al Jazaery | G06V 20/48 |
| 2020/0192622 A1* | 6/2020 | Stoyles | G06F 3/0346 |
| 2020/0204952 A1* | 6/2020 | Sorrentino | H04W 4/027 |
| 2021/0022218 A1* | 1/2021 | Maeng | H04L 12/282 |
| 2021/0059031 A1* | 2/2021 | Goor | H05B 47/115 |
| 2021/0182111 A1* | 6/2021 | Jakobsson | H04L 67/16 |

FOREIGN PATENT DOCUMENTS

| | | | |
|---|---|---|---|
| CN | 105657638 A | 6/2016 | |
| CN | 106465048 A | 2/2017 | |
| CN | 106773772 A | 5/2017 | |
| CN | 107343087 A | 11/2017 | |
| CN | 107577151 A | 1/2018 | |
| CN | 108123855 A | 6/2018 | |
| CN | 108632094 A | 10/2018 | |
| CN | 109407524 A | 3/2019 | |
| CN | 110224901 A | 9/2019 | |
| CN | 110287036 A | 9/2019 | |
| WO | 2015179031 A1 | 11/2015 | |

OTHER PUBLICATIONS

1st Office Action of CN 201911129464.1 dated May 17, 2021.
2nd Office Action of CN 201911129464.1 dated Nov. 29, 2021.
Qi Jinwei, "AllJoyn Smart Home Interactive Mode Solution", New Technology & New Products of China, Jan. 25, 2017.
CN Notice of Allowance in Application No. 201911129464.1, dated Feb. 28, 2022.

\* cited by examiner

FUNCTION CONTROL METHOD, FUNCTION CONTROL DEVICE, AND COMPUTER-READABLE STORAGE MEDIUM

CROSS-REFERENCE TO RELATED APPLICATION

This application claims priority to Chinese Patent Application No. 201911129464.1 filed on Nov. 18, 2019, the disclosure of which is hereby incorporated by reference in its entirety.

BACKGROUND

With development of technologies, Internet of Things (IoT) devices are more and more widely used. The IoT devices can have capabilities of implementing various functions. When implementing functions, the IoT devices perform functions based on their own functional capabilities and function performing instructions corresponding to the functional capabilities.

SUMMARY

The present disclosure relates to a technical field of terminals, and more specifically, to a function control method, a function control device, and a computer-readable storage medium.

According to a first aspect of embodiments of the present disclosure, there is provided a function control method which is applied to a first device, and the function control method includes:

monitoring a function trigger event which has a preset correspondence between the function trigger event and the function configuration information; retrieving the function configuration information corresponding to the function trigger event when the function trigger event is monitored; and controlling a second device to perform a specified function triggered by the function trigger event based on the function configuration information.

In some embodiments, the function configuration information indicates the second device that needs to be correspondingly triggered by the function trigger event;

controlling the second device to perform the specified function triggered by the function trigger event based on the function configuration information includes:

sending a function performing instruction for performing the specified function to the second device indicated by the function configuration information, and controlling the second device to perform the specified function.

In some embodiments, the function control method involved in the present disclosure further includes:

determining devices that have a capability to perform the specified function based on capabilities supported by other devices different from the first device that are pre-recorded or found; displaying prompt information which is configured to prompt a user to select the second device for performing the specified function from the devices that have the capability to perform the specified function; and pre-configuring the function configuration information based on the second device selected by the user and the specified function.

In another embodiment, the function configuration information indicates the specified function;

controlling the second device to perform the specified function triggered by the function trigger event based on the function configuration information includes:

determining devices that have a capability to perform the specified function based on capabilities supported by other devices different from the first device that are pre-recorded or found; selecting the second device for performing the specified function from the devices that have the capability to perform the specified function; and sending the function performing instruction for performing the specified function to the selected second device, and controlling the second device to perform the specified function.

In some embodiments, selecting the second device for performing the specified function from the devices that have the capability to perform the specified function includes:

selecting a device within a preset distance range from a specified position among the devices that have the capability to perform the specified function as the second device for performing the specified function.

In some embodiments, the function control method involved in the present disclosure further includes:

pre-recording capabilities of devices in a same local area network or within a predetermined connection range; and/or broadcasting a capability information query request, and receiving capability information response of each device fed back by each device, wherein each device has pre-recorded its own capability information, or each device determines its own capabilities according to functions corresponding to its hardware components.

In some embodiments, the function trigger event includes one or a combination of:

a voice command input event; a human activity event; and a gesture input event.

According to a second aspect of the embodiments of the present disclosure, there is provided a function control device which is applied to a first device, and the function control device includes:

a monitoring component, configured to monitor a function trigger event which has a preset correspondence with the function configuration information; a retrieving component, configured to retrieve the function configuration information corresponding to the function trigger event when the function trigger event is monitored by the monitoring component; and a performing component, configured to control a second device to perform a specified function triggered by the function trigger event based on the function configuration information.

In some embodiments, the function configuration information indicates the second device correspondingly performing the specified function triggered by the function trigger event.

The performing component controls the second device to perform the specified function triggered by the function trigger event based on the function configuration information by:

sending a function performing instruction for performing the specified function to the second device indicated by the function configuration information, and controlling the second device to perform the specified function.

In some embodiments, the function control device further includes:

a determining component, configured to determine devices that have a capability to perform the specified function based on capabilities supported by other devices different from the first device that are pre-recorded or found; a display component, configured to display prompt information which is configured to prompt a user to select the second device for performing the specified function among the devices that have the capability to perform the specified function; and a configuration component, configured to pre-configure the function configuration information based on the second device selected by the user and the specified function.

In some embodiments, the function configuration information indicates the specified function.

The performing component controls the second device to perform the specified function triggered by the function trigger event based on the function configuration information by:

determining devices that have a capability to perform the specified function based on capabilities supported by other devices different from the first device that are pre-recorded or found; selecting the second device for performing the specified function among the devices that have the capability to perform the specified function; and sending the function performing instruction for performing the specified function to the selected second device, and controlling the second device to perform the specified function.

In still another embodiment, the performing component is configured to select the second device for performing the specified function among the devices that have the capability to perform the specified function by:

selecting a device within a preset distance range from a specified position among the devices that have the capability to perform the specified function as the second device for performing the specified function.

In some embodiments, the function control device further includes:

a recording component, configured to pre-record capabilities of devices in a same local area network or within a predetermined connection range and/or to broadcast a capability information query request, and receive a response of capability information of each device fed back by each device, wherein each device has pre-recorded its own capability information, or each device determines its own capabilities according to functions corresponding to its hardware components.

In some embodiments, the function trigger event includes one or a combination of:

a voice command input event; a human activity event; and a gesture input event.

According to a third aspect of the embodiments of the present disclosure, a function control device is provided, including:

a processor; and a memory for storing instructions executable by the processor, the processor is configured to perform the function control method described in the first aspect or any one of the embodiments of the first aspect.

According to a fourth aspect of the embodiments of the present disclosure, there is provided a non-transitory computer-readable storage medium which, when instructions in the storage medium are executed by a processor of a device, enables the device to perform the function control method described in the first aspect or any one of the embodiments of the first aspect.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the disclosure and constitute a part thereof, show exemplary embodiments of the present disclosure, and serve to explain the principles of the present disclosure along with the specification.

DETAILED DESCRIPTION

Figure 1:
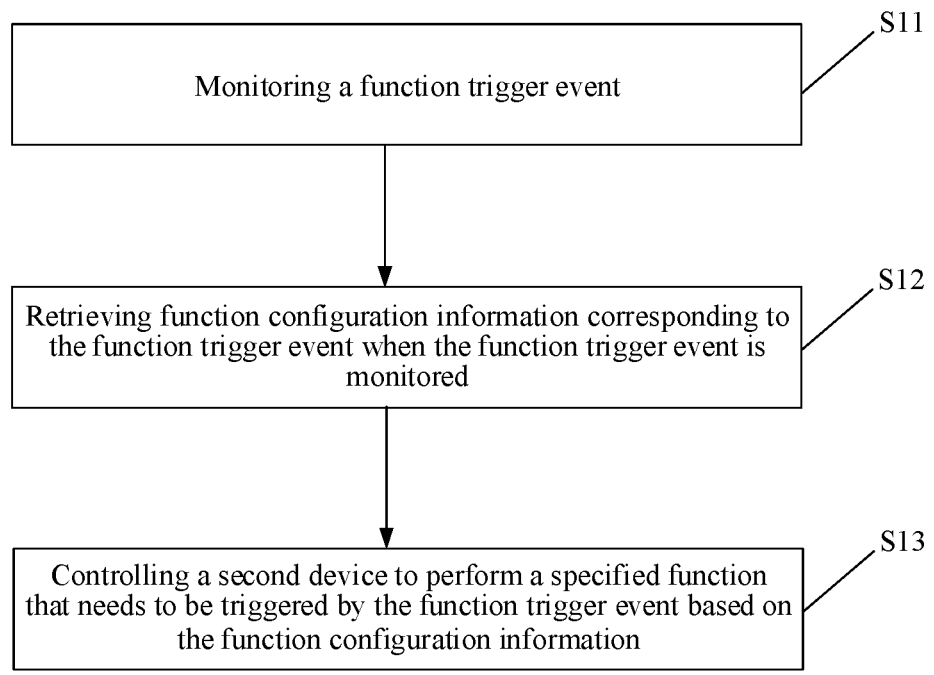
FIG. 1 is a first flowchart showing a function control method according to some embodiments.

Exemplary embodiments will be described in detail herein, examples of which are illustrated in the accompanying drawings. The following description refers to accompanying drawings in which the same numbers in the different drawings represent the same or similar elements unless otherwise indicated. The implementations set forth in the following description of exemplary embodiments do not represent all implementations consistent with the present disclosure. Instead, they are merely examples of devices and methods consistent with aspects of the present disclosure as recited in the appended claims.

The function control method provided by the embodiments of the present disclosure can be applied to a scenario where interactive control is implemented among multiple IoT devices. For example, it can be applied to an interactive control scenario among smart appliances in a smart home system. The IoT devices involved in the embodiments of the present disclosure may be smart appliances such as smart speakers, smart TVs, routers, smart lights, or the like.

Typical IoT devices with device capabilities to perform corresponding functions can perform the corresponding functions. The device capabilities of the IoT devices to perform the functions can be understood as hardware support capabilities, or software support capabilities. However, the IoT devices usually control themselves to perform corresponding functions according to their own device capabilities, and do not control the functions performed by other devices. Various embodiments of the present disclosure can address how to realize linkage control among devices to achieve the interconnection and intercommunication of the IoT devices under the IoT.

In various embodiments of the present disclosure, terms of "device" and "IoT device" are sometimes used interchangeably, and those skilled in the art should understand the meaning thereof.

Embodiments of the present disclosure provide a function control method in which correspondence between a function trigger event and function configuration information is pre-set, and the function trigger event is monitored. When the function trigger event is monitored, the function configuration information corresponding to the function trigger event is retrieved. A second device is controlled to perform the specified function triggered by the function trigger event based on the function configuration information, thereby fully utilizing the capabilities of each of the devices to perform the specified functions and realizing the linkage of multiple devices.

In some embodiments, the devices can have a bus function. The bus can be understood as a mechanism for capability information interaction between devices, and can also be understood as a service. For example, the mechanism of capability information interaction between devices for the bus may include one or more of capability information definition, capability information data structure definition, and capability information transmission protocol definition.

As such, the capability information can be defined in advance. For example, a device provided with a display screen has a display capability, a device provided with a speaker has a sound play capability, a device provided with a communication module has a communication capability, and a device provided with a processor has a computing capability. It also can be determined that the device has a corresponding capability through the function realized by the installed software. For example, the device installed with a navigation software has a navigation capability, and so on, and the examples are not exhausted here. A data structure can be defined for each of the capabilities, including setting a capability identifier for the capability, setting hardware parameters and software parameters corresponding to the capability, defining a transmission protocol and a transmission interface for the capability information interaction between the devices, and so on, so that the devices can find and synchronize the capability information, realize mutual invocation of capabilities, and expand their own functions.

When the capability is invoked, only the invoked capability of the corresponding device can be invoked. For example, when the TV invokes an audio collection capability of a speaker equipment, it can only use a sound pickup device such as a microphone of the speaker equipment without using other components of the speaker equipment. Correspondingly, in addition to providing the definitions associated with the capability information transmission, the device should also provide a corresponding capability invocation interface, that is, an interface for invoking the hardware component or software for the capability, so as to provide the capability to the invoking device for use. Continuing with the above example, for the audio collection capability of the speaker equipment, an invocation interface corresponding to the pickup device should be provided. When the TV needs to invoke the audio collection capability of the speaker equipment, the invocation interface of the microphone component of the speaker equipment can be invoked so as to control the microphone of the speaker equipment to collect audio and transmit the collected audio data to the TV.

Further, in some embodiments of the present disclosure, the bus function may be performed by each device independently, that is, the bus may also be understood as an application installed on the device. The bus installed on the device can record and store the capabilities registered by each device. For example, the first device may register its own capabilities to the bus, and other devices may also register the capabilities to the bus in the first device.

In some embodiments of the present disclosure, the device may use the bus function to record and store the capabilities of the device itself and other devices different therefrom, and maintain the capability information interaction between the devices. For example, the device may record in advance the capabilities of the devices in the same local area network or in a predetermined connection range. The device may also broadcast a capability information query request and receive a response of capability information of each device fed back by each device to find the device with the corresponding capability. The device can pre-record its own capability information, or the device can determine its own capabilities in accordance with the functions corresponding to its hardware components.

In some embodiments of the present disclosure, the interactive control can be performed between the devices that have recorded capabilities of themselves and other devices. The respective devices can monitor the function trigger event. When the function trigger event occurs, the device that monitored the occurrence of the trigger event can invoke the corresponding function configuration information and interact with other devices to control other devices to perform a specified function triggered by the function trigger event.

In some embodiments of the present disclosure, the device that monitored the occurrence of the function trigger event is referred to as a first device, and the device that performs the specified function configured by the function configuration information is referred to as a second device. It can be understood that the second device may also function as the first device to monitor the function trigger event and control the other devices.

FIG. 1 is a flowchart showing a function control method according to some embodiments. As shown in FIG. 1, the function control method is applied to the first device and includes the following steps.

In step S11, a function trigger event is monitored.

In some embodiments of the present disclosure, there is a preset correspondence between the function trigger event and the function configuration information. The function configuration information is configured to configure the function to be performed. In other words, the specified function to be performed can be determined from the function configuration information. The function trigger event is configured to trigger the performing of the specified function to be performed which is configured by the function configuration information.

The specified function to be performed which is configured by the function configuration information may be a function to be performed by the first device itself or a function to be performed by the second device. Some embodiments of the present disclosure are primarily described in the case where the specified function configured by the function configuration information is performed by the second device different from the first device itself.

The function trigger event in some embodiments of the present disclosure can be understood as a preset trigger mechanism which can be set on the devices. A trigger can be installed on the device, and the function trigger event is monitored by the trigger. When the function trigger event has been monitored, a subsequent process of performing the function can be performed. When the function trigger event is not monitored, there may be no process. The trigger can include a device with a monitoring function, and can include a camera, a network connection device, various sensors, or the like.

Further, in some embodiments of the present disclosure, the function trigger event can include various trigger events, such as a voice command input event, a human activity event, or a gesture input event, which is not limited in the embodiments of the present disclosure.

It can be understood that, in some embodiments of the present disclosure, there may be one or more functions configured by the function configuration information, and the specified function triggered by the function trigger event has a one-to-one correspondence or one-to-multiple correspondence with the function trigger event.

In step S12, when the function trigger event is monitored, the function configuration information corresponding to the function trigger event is retrieved.

The preset correspondence between the function trigger event and the function configuration information may be configured in advance in some embodiments of the present disclosure. After the function trigger event is monitored, the function configuration information corresponding to the monitored function trigger event can be retrieved based on the preset correspondence between the function trigger event and the function configuration information.

In step S13, the second device is controlled to perform a specified function triggered by the function trigger event based on the function configuration information.

In some embodiments of the present disclosure, when the first device monitors the function trigger event, the first device retrieves the function configuration information corresponding to the monitored function trigger event based on the preset correspondence between the function trigger event and the function configuration information, and controls the second device to perform the specified function triggered by the function trigger event based on the function configuration information, thereby fully utilizing the capabilities of each device to perform the specified function and realizing the linkage of multiple devices.

In some embodiments of the present disclosure, the function configuration information may indicate the second device required to perform the specified function, that is, the function configuration information indicates the corresponding second device to perform the specified function triggered by the function trigger event, and the first device directly controls the second device indicated by the function configuration information to perform the corresponding specified function. In another embodiment, the function configuration information may not indicate the second device for performing the specified function, but only indicates the specified function to be performed. When the specified function is to be performed, the first device finds and determines the second device which has the device capability to perform the corresponding specified function, and controls the second device to perform the corresponding specified function.

Figure 2:
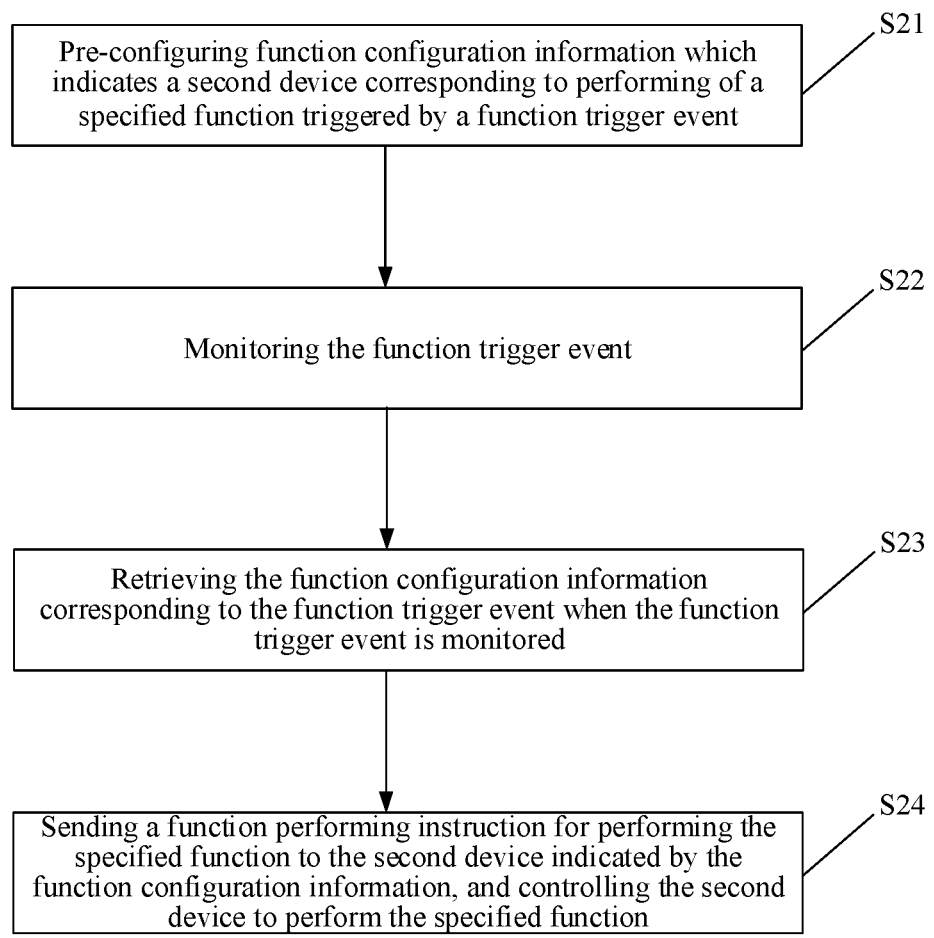
FIG. 2 is a second flowchart showing a function control method according to some embodiments.

FIG. 2 is a flowchart showing a function control method according to some embodiments. Referring to FIG. 2, the function control method includes the following steps.

In step S21, the function configuration information is pre-configured, the function configuration information indicating a second device corresponding to the performing of the specified function triggered by the function trigger event.

Figure 3:
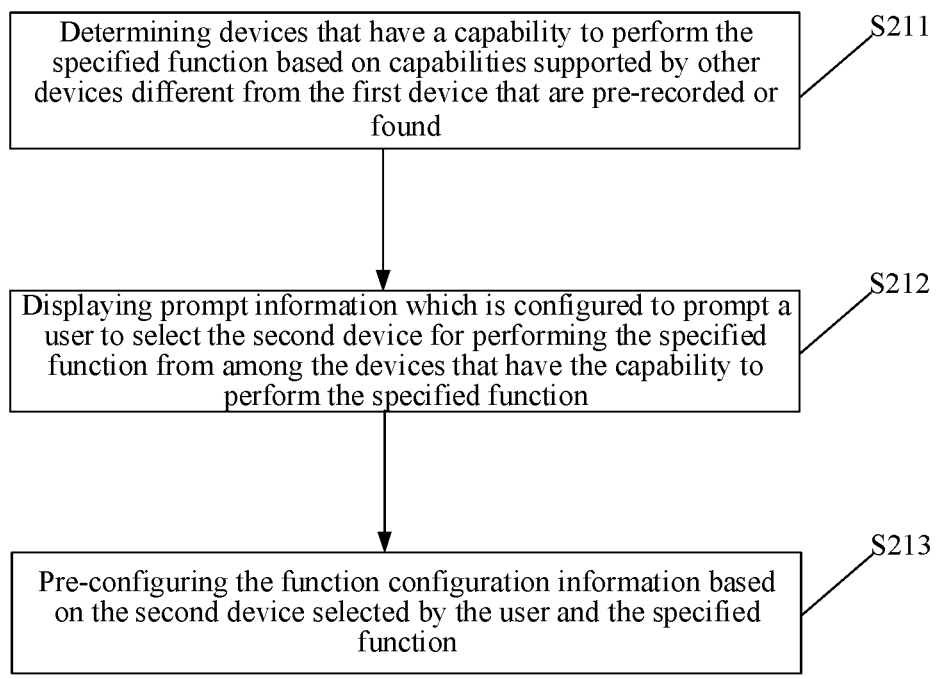
FIG. 3 is a flowchart showing pre-configuring function configuration information according to some embodiments.

In some embodiments of the present disclosure, the process of configuring the function configuration information is as shown in FIG. 3, which includes the following steps.

In step S211, devices that have a capability to perform the specified function are determined based on capabilities supported by other devices different from the first device that are pre-recorded or found.

In some embodiments of the present disclosure, the capabilities supported by the other devices can be recorded by the bus in advance. Based on the capabilities supported by the other devices different from the first device that are pre-recorded or found, the devices that have a capability to perform the specified function are determined. For example, the specified function is "turning on the light", and the devices that have a capability to perform the function of "turning on the light" may be a device which can turn on or off the light, such as a switch or a remote controller.

In step S212, prompt information is displayed.

In some embodiments of the present disclosure, the prompt information is configured to prompt a user to select the second device for performing the specified function among the devices that have the capability to perform the specified function. In the above example, it is determined that the devices with the capability to perform the function of "turning on the light" are a switch and a remote controller, and the prompt information, such as listed items or the like, which has a function of prompting selection can be displayed so that the user can select the second device for performing the function of "turning on the light". The user can select either the switch or the remote controller as the second device.

In step S213, the function configuration information is pre-configured based on the second device selected by the user and the specified function.

In some embodiments of the present disclosure, the pre-configured function configuration information includes a function to be performed and a corresponding second device for performing the function. For example, in the above example, the function configuration information includes turning on the light through the remote controller.

It can be understood that the process of configuring the function configuration information in the embodiments of the present disclosure is not necessary to be performed every time when the function control process is performed, and may be performed only when configuration process is required.

In step S22, the function trigger event is monitored.

Further, in some embodiments of the present disclosure, the correspondence between the function trigger event and the function configuration information is preset. For example, in the above example, the function trigger event may be a voice command input event. For example, the first device is a speaker equipment, and the voice command input event may be a voice input command of "Xiaoai, please turn on the light for me" detected by the speaker equipment. If the speaker equipment has detected the voice input command of "Xiaoai, please turn on the light for me", it is determined that the function trigger event has been monitored. If the speaker equipment does not detect the voice input command of "Xiaoai, please turn on the light for me", it is determined that the function trigger event is not monitored.

The function trigger event may also be a human activity event that is detected. For example, the human activity event may be "a person passes by a first device". Assuming that the first device is a speaker equipment, when a person passes by the speaker equipment, the speaker equipment detects that someone has passed by, and it is determined that the function trigger event has been monitored. If the speaker equipment does not detect that anyone has passed by, and it is determined that the function trigger event is not monitored.

The function trigger event may also be a gesture input event. For example, the gesture input event may be a specified gesture. Assuming that the first device is a speaker equipment, the speaker equipment detects the above specified gesture, and it is determined that the function trigger event has been monitored. If the speaker equipment does not detect the above specified gesture, it is determined that the function trigger event is not monitored.

In step S23, when the function trigger event is monitored, the function configuration information corresponding to the function trigger event is retrieved.

For example, in the above example, when it is detected that a person is passing by the first speaker, the function configuration information corresponding to the function trigger event that triggers the performing of turning on the light through the remote controller is retrieved.

In step S24, a function performing instruction for performing the specified function is sent to the second device indicated by the function configuration information, and the second device is controlled to perform the specified function.

For example, in the above example, the first device is a speaker equipment, the second device is a remote controller, the specified function is turning on the light, and the function performing instruction is an instruction to turn on the light. The speaker equipment sends the function performing instruction for turning on the light to the remote controller, and the remote controller performs the function of turning on the light.

Figure 4:
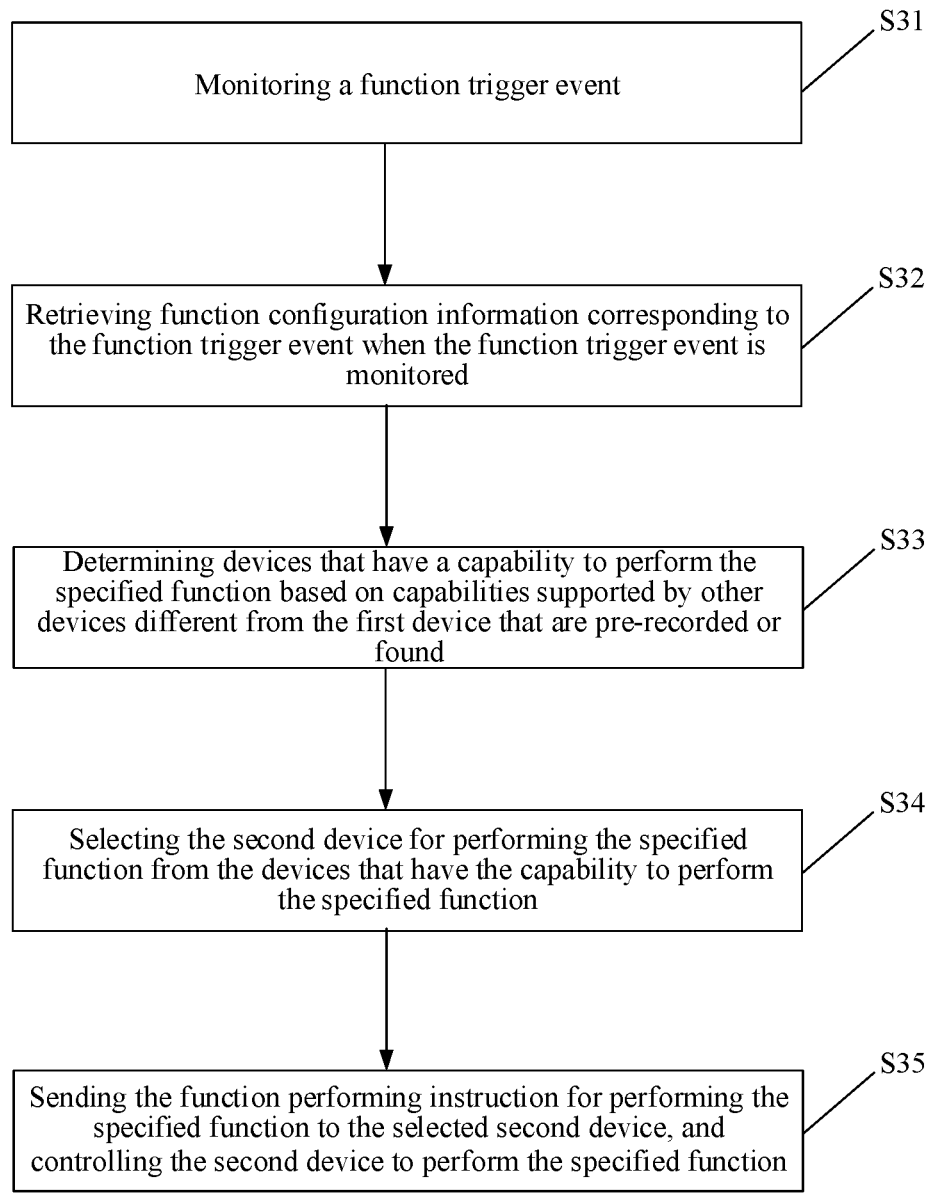
FIG. 4 is a flowchart showing a function control method according to some embodiments.

FIG. 4 is a flowchart showing a function control method according to some embodiments. Referring to FIG. 4, the function control method includes the following steps.

In step S31, a function trigger event is monitored.

In some embodiments of the present disclosure, the function trigger event may be a voice command input event, such as a voice input command of "Xiaoai, please turn on the light for me". The function trigger event may also be a human activity event that is detected. For example, the human activity event may be "a person passes by a first device". The function trigger event may also be a gesture input event. For example, the gesture input event may be a specified gesture.

In step S32, when the function trigger event is monitored, the function configuration information corresponding to the function trigger event is retrieved.

In some embodiments of the present disclosure, the function configuration information indicates a specified function, but does not indicate the device for performing the specified function. For example, the function configuration information indicates a function of "turning on the light".

In step S33, devices that have a capability to perform the specified function are determined based on capabilities supported by other devices different from the first device that are pre-recorded or found.

The capabilities supported by the other devices in some embodiments of the present disclosure may be recorded by the bus in advance. Based on the capabilities supported by the other devices different from the first device that are recorded in advance, the devices that have the capability to perform the specified function are determined. For example, the specified function is "turning on the light", and the devices that have the capability to perform the function of "turning on the light" may be a device which can turn on or off the light, such as a switch or a remote controller.

In this step, a finding operation may be performed in advance or performed after the function configuration information corresponding to the function trigger event is retrieved and the specified function indicated by the function configuration information is determined, so as to find the devices that have the capability to perform the specified function by broadcasting.

In step S34, the second device for performing the specified function is selected from the devices that have the capability to perform the specified function.

In some embodiments of the present disclosure, one or more second devices may be selected to perform the specified function. In the above example, it is determined that the devices with the capability to perform the function of "turning on the light" are the switch and the remote controller, and the second device for turning on the light can be selected from the switch and the remote controller. The user can select either the switch or the remote controller as the second device, or select both the switch and the remote controller as the second device. When there are multiple second devices, there may be multiple specified functions, and the different second devices may control the different functions to be performed. For example, the switch and the remote controller can control different lights to perform different functions.

In some embodiments of the present disclosure, when the second device for performing the specified function is selected from the devices that have the capability to perform the specified function, a device within a preset distance range from a specified position can be selected from the devices that have the capability to perform the specified function as the second device for performing the specified function, in order to perform control on the devices within the specified range. For example, when the devices in each room in the smart home appliance scenario are controlled separately, devices in the range of the same room can be selected to control.

Further, the specified position here may be either the position of the device (for example, the first device), or the position of the user. That is, after the function trigger event is detected, the position of the user can be detected. After multiple devices are determined to have the capability to perform the specified function, the second device is determined based on the user's position, for example, the second device with the shortest distance from the user's position. For example, when the user makes a voice command of "Xiaoai, I'm back", the speaker equipment monitors the function trigger event, and determines, according to the function configuration information, that the specified function triggered by the function trigger event is to turn on the light. Based on the pre-recorded capabilities or by broadcasting, it is found that both the first bedroom and the second bedroom are equipped with the devices that has the capability of lighting, such as smart lights. At this time, the position of the user is detected and tracked. If it is detected that the user enters the first bedroom, the smart light in the first bedroom is determined as the second device.

In step S35, a function performing instruction for performing the specified function is sent to the selected second device, and the second device is controlled to perform the specified function.

For example, in the above example, the first device is the speaker equipment, the second device is the remote controller, the specified function is turning on the light, and the function performing instruction is to turn on the light. The speaker equipment sends the function performing instruction for turning on the light to the remote controller, and the remote controller performs the function of turning on the light.

According to the function control method provided by some embodiments of the present disclosure, when a function trigger event is monitored by a first device, based on the correspondence between the function trigger event and function configuration information, a second device is controlled to perform a specified function triggered by the function trigger event based on the function configuration information, thereby realizing joint control of the capabilities between the devices, and fully utilizing the capabilities of each device to perform the specified function.

Based on the same concept, some embodiments of the present disclosure also provide a function control device.

It can be understood that, in order to realize the above-mentioned functions, the function control device provided by some embodiments of the present disclosure can include a hardware structure and/or a software module corresponding to each function. In conjunction with the exemplary units and algorithm steps disclosed in some embodiments of the present disclosure, some embodiments of the present disclosure can be carried out by the hardware or a combination of the hardware and the computer software. Whether the functions are implemented by hardware or computer software driving the hardware depends on particular applications and design constraints of the technical solutions. For each of the particular applications, a person skilled in the art can use different methods to implement the described functions, and such implementations should not be considered as going beyond the scope of the present disclosure.

Figure 5:
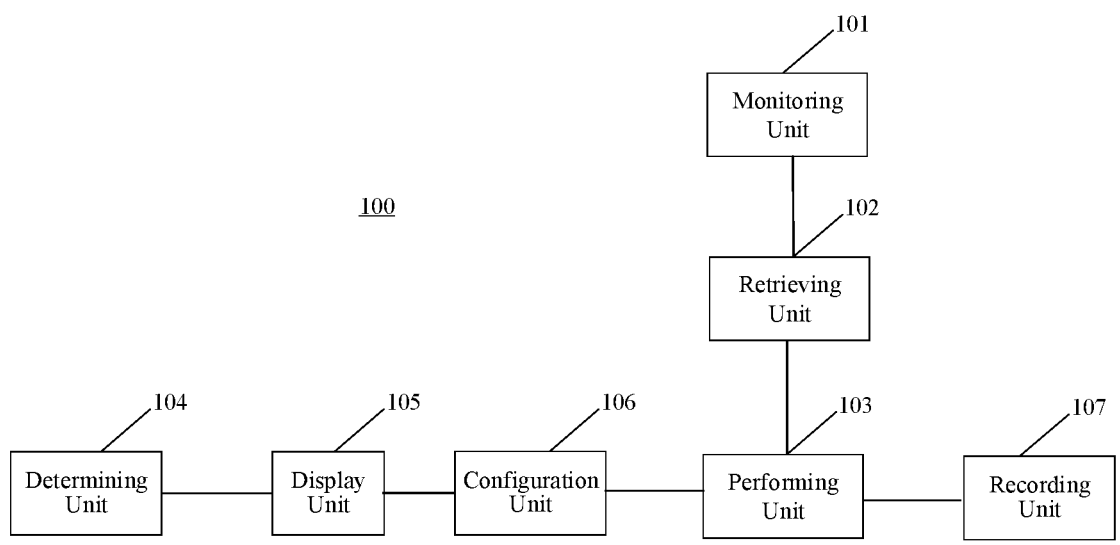
FIG. 5 is a first block diagram showing a function control device according to some embodiments.

FIG. 5 is a block diagram showing a function control device according to some embodiments. Referring to FIG. 5, the function control device 100 includes a monitoring component 101, a retrieving component 102 and a performing component 103.

The monitoring component 101 is configured to monitor a function trigger event which has a preset correspondence with function configuration information. The retrieving component 102 is configured to retrieve the function configuration information corresponding to the function trigger event when the function trigger event is monitored by the monitoring component 101. The performing component 103 is configured to control a second device to perform a specified function triggered by the function trigger event based on the function configuration information.

In some embodiments, the function configuration information indicates the second device triggered by the function trigger event.

The performing component 103 controls the second device to perform the specified function triggered by the function trigger event based on the function configuration information in the following manner:

sending a function performing instruction for performing the specified function to the second device indicated by the function configuration information, and controlling the second device to perform the specified function.

In another embodiment, the function control device 100 further includes a determining component 104, a display component 105, and a configuration component 106.

The determining component 104 is configured to determine devices that have a capability to perform the specified function based on capabilities supported by other devices from the first device that are pre-recorded or found. The display component 105 is configured to display prompt information which is configured to prompt a user to select the second device to perform the specified function from the devices that have the capability to perform the specified function. The configuration component 106 is configured to pre-configure the function configuration information based on the second device selected by the user and the specified function.

In still another embodiment, the function configuration information indicates the specified function.

The performing component 103 controls the second device to perform the specified function triggered by the function trigger event based on the function configuration information in the following manner:

determining devices that have the capability to perform the specified function based on capabilities supported by other devices from the first device that are pre-recorded or found; selecting the second device to perform the specified function from the devices that have the capability to perform the specified function; and sending the function performing instruction for performing the specified function to the selected second device, and controlling the second device to perform the specified function.

In another embodiment, the performing component 103 is configured to select the second device to perform the specified function from the devices that have the capability to perform the specified function in the following manner:

selecting a device within a preset range from a specified position among the devices that have the capability to perform the specified function as the second device for performing the specified function.

In yet another embodiment, the function control device further includes a recording component 107.

The recording component 107 is configured to pre-record capabilities of devices in a same local area network or within a predetermined connection range and/or to broadcast a capability information query request, and receive a response of capability information of each device fed back by each device. Each device can pre-record its own capability information, or each device can determine its own capabilities according to functions corresponding to its hardware components.

In yet another embodiment, the function trigger event includes one or a combination of a voice command input event; a human activity event; and a gesture input event.

Regarding the device in the above embodiments, the specific manner in which each module performs operations has been described in detail in some embodiments related to the methods, and will not be elaborated here.

Figure 6:
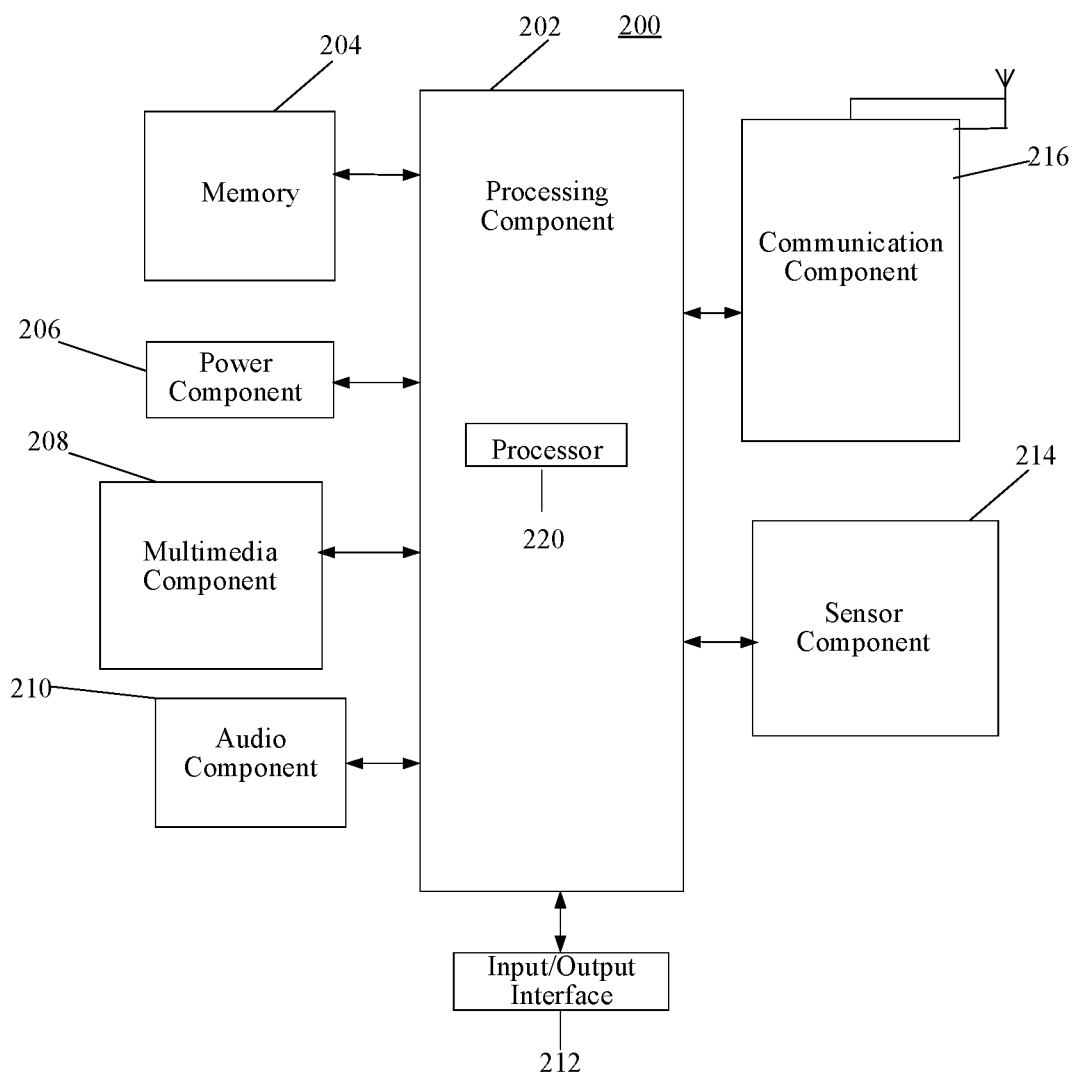
FIG. 6 is a second block diagram showing a device for function control according to some embodiments.

FIG. 6 is a block diagram showing a remote controller device 200 according to some embodiments. For example, the remote controller device 200 may be a mobile phone, a computer, a digital broadcasting terminal, a messaging device, a game console, a tablet device, a medical device, a fitness device, a personal digital assistant, and so on.

Referring to FIG. 6, the remote controller device 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls the overall operations of the remote controller device 200, such as the operations associated with display, telephone calls, data communications, camera operations, and recording operations. The processing component 202 can include one or more processors 220 to execute instructions to execute all or part of the steps in the above described methods. Moreover, the processing component 202 can include one or more modules to facilitate the interaction between the processing component 202 and other components. For example, the processing component 202 can include a multimedia module to facilitate the interaction between the multimedia component 208 and the processing component 202.

The memory 204 is configured to store various types of data to support the operation of the remote controller device 200. Examples of such data include instructions for any application or method operated on device 200, such as the contact data, the phone book data, messages, pictures, videos, and the like. The memory 204 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the remote controller device 200. The power component 206 can include a power management system, one or more power sources, and other components associated with the generation, management, and distribution of power in the remote controller device 200.

The multimedia component 208 includes a screen providing an output interface between the remote controller device 200 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. When the remote controller device 200 is in an operation mode, such as a photographing mode or a video mode, the front camera and/or the rear camera can receive an external multimedia datum. Each of the front camera and the rear camera may be a fixed optical lens system or have focus and optical zoom capability.

The audio component 210 is configured to output and/or input an audio signal. For example, the audio component 210 includes a microphone (MIC) configured to receive an external audio signal when the remote controller device 200 is in an operation mode, such as a call mode, a recording mode, and a voice recognition mode. The received audio signal may be further stored in the memory 204 or sent via the communication component 216. In some embodiments, the audio component 210 also includes a speaker for outputting the audio signal.

The I/O interface 212 provides an interface between the processing component 202 and peripheral interface modules, such as a keyboard, a click wheel, buttons, and the like. These buttons may include, but are not limited to, a home button, a volume button, a starting button, and a locking button.

The sensor component 214 includes one or more sensors for providing status assessments of various aspects of the remote controller device 200. For example, the sensor component 214 can detect an open/closed status of the remote controller device 200, relative positioning of components, such as the display and the keypad of the remote controller device 200. The sensor component 214 can also detect a change in position of one component of the remote controller device 200 or the remote controller device 200, the presence or absence of user contact with the remote controller device 200, an orientation, or an acceleration/deceleration of the remote controller device 200, and a change in temperature of the remote controller device 200. The sensor component 214 can include a proximity sensor configured to detect the presence of nearby objects without any physical contact. The sensor component 214 can also include a light sensor, such as a CMOS or CCD image sensor, configured to use in imaging applications. In some embodiments, the sensor component 214 can also include an accelerometer sensor, a gyroscope sensor, a magnetic sensor, a pressure sensor, or a temperature sensor.

The communication component 216 is configured to facilitate wired or wireless communication between the remote controller device 200 and other devices. The remote controller device 200 can access a wireless network based on a communication standard, such as Wi-Fi, 2G, 3G, 4G, 5G, or a combination thereof. In some embodiments, the communication component 216 receives broadcast signals or broadcast associated information from an external broadcast management system via a broadcast channel. In some embodiments, the communication component 216 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the remote controller device 200 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor, or other electronic components.

In some embodiments, there is also provided a non-transitory computer-readable storage medium including instructions, such as a memory 204 including instructions executable by the processor 220 of the remote controller device 200 to perform the above described method. For example, the non-transitory computer readable storage medium may be a ROM, a random-access memory (RAM), a CD-ROM, a magnetic tape, a floppy disc, and an optical data storage device.

Various embodiments of the present disclosure can have one or more of the following advantages. Based on the preset correspondence between the function trigger event and the function configuration information, when the function trigger event is monitored, the function configuration information corresponding to the monitored function trigger event is retrieved, and other devices are controlled to perform the specified function that needs to be triggered by the function trigger event based on the function configuration information, thereby fully utilizing the capabilities of each device to perform the specified function and realizing the linkage of multiple devices.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A function control method, applied to a first device, the method comprising:
    monitoring a function trigger event that has a preset correspondence with function configuration information;
    retrieving the function configuration information corresponding to the function trigger event in response to that the function trigger event is monitored, wherein the function configuration information indicates a specified function triggered by the function trigger event and does not indicate a device that has a capability to perform the specified function;
    in response to determining the specified function triggered by the function trigger event and in response to determining that the specified function is to be performed by a device different from the first device, discovering devices that have a capability to perform the specified function based on capabilities supported by other devices different from the first device through broadcasting;
    selecting a second device for performing the specified function among the discovered devices that have the capability to perform the specified function; and
    controlling the second device to perform the specified function,
    wherein the selecting the second device for performing the specified function among the discovered devices that have the capability to perform the specified function comprises:
    selecting a device within a distance range from a specified position among the discovered devices that have the capability to perform the specified function as the second device for performing the specified function.

2. The function control method according to claim 1, wherein the controlling the second device to perform the specified function comprises:
    sending the function performing instruction for performing the specified function to the second device, and controlling the second device to perform the specified function.

3. The function control method according to claim 1, wherein the specified position is a position of the first device or a position of a user.

4. The function control method according to claim 1, further comprising:
- pre-recording capabilities of devices in a same local area network or within a predetermined connection range; and/or
- broadcasting a capability information query request, and receiving a response of capability information of each device fed back by each device, wherein the capability information of the device is pre-recorded by the device or determined by the device according to functions corresponding to its own hardware components.

5. The function control method according to claim 1, wherein the function trigger event comprises at least one of:
- a voice command input event;
- a human activity event; and
- a gesture input event.

6. An electronic device, comprising:
- a processor; and
- a memory component storing instructions executable by the processor,
- wherein the processor is configured to execute the instructions to cause the electronic device to perform a function control method, the method comprising:
- monitoring a function trigger event which has a preset correspondence with function configuration information;
- retrieving the function configuration information corresponding to the function trigger event in response to that the function trigger event is monitored, wherein the function configuration information indicates a specified function triggered by the function trigger event and does not indicate a device that has a capability to perform the specified function;
- in response to determining the specified function triggered by the function trigger event and in response to determining that the specified function is to be performed by a device different from the first device, discovering devices that have a capability to perform the specified function based on capabilities supported by other devices different from the first device through broadcasting;
- selecting a second device for performing the specified function among the discovered devices that have the capability to perform the specified function; and
- controlling the second device to perform the specified function,
- wherein the selecting the second device for performing the specified function among the discovered devices that have the capability to perform the specified function comprises:
- selecting a device within a distance range from a specified position among the discovered devices that have the capability to perform the specified function as the second device for performing the specified function.

7. The electronic device according to claim 6, wherein the controlling the second device to perform the specified function comprises:
- sending the function performing instruction for performing the specified function to the selected second device, and controlling the second device to perform the specified function.

8. The function control method according to claim 6, wherein specified position is a position of the first device or a position of a user.

9. The electronic device according to claim 6, wherein the method further comprises:
- pre-recording capabilities of devices in a same local area network or within a predetermined connection range; and/or
- broadcasting a capability information query request, and receiving a response of capability information of each device fed back by the each device, wherein the capability information of the each device is pre-recorded by the each device or determined by the each device according to functions corresponding to its own hardware components.

10. The electronic device according to claim 6, wherein the function trigger event comprises at least one of:
- a voice command input event;
- a human activity event; and
- a gesture input event.

11. A non-transitory computer-readable storage medium having stored thereon instructions which, when executed by a processor of a device, cause the device to perform the function control method of claim 1.

12. An Internet of Things (IoT) system implementing the function control method of claim 1, comprising a plurality of IoT devices including the first device and the second device,
- wherein based on the preset correspondence between the function trigger event and the function configuration information, when the function trigger event is monitored by the first device, the function configuration information corresponding to the monitored function trigger event is retrieved by the first device, and the IoT system is configured to control devices among the plurality of the IoT devices other than the first device to perform the specified function that needs to be triggered by the function trigger event based on the function configuration information, thereby fully utilizing capabilities of each of the plurality of IoT devices to perform the specified function and realizing linkage of the plurality of IoT devices; and
- wherein the first device comprises a speaker, the specified function is turning on a light, the IoT system is configured to detect and track position of a user; when it is detected that the user enters a first room, a smart light in the first room is determined as the second device, and when it is detected that the user enters a second room, a smart light in the second room is determined as the second device; the speaker is configured to send the function performing instruction for turning on the light to the second device to perform the function of turning on the light.

* * * * *